(12) United States Patent
Pereira Penha et al.

(10) Patent No.: US 11,647,115 B2
(45) Date of Patent: May 9, 2023

(54) CONFORMATIONAL FRAMEWORK FOR CALL DROP LIKELIHOOD FROM INTERACTIVE VOICE RESPONSE SYSTEM

(71) Applicant: Optum Services (Ireland) Limited, Dublin (IE)

(72) Inventors: Mariah Sonja Pereira Penha, Dublin (IE); Damian Kelly, Kildare (IE); Gregory Buckley, Dublin (IE); Jack Sullivan, Dublin (IE); Bruno Ohana, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 160 days.

(21) Appl. No.: 17/157,064

(22) Filed: Jan. 25, 2021

(65) Prior Publication Data

US 2022/0239775 A1    Jul. 28, 2022

(51) Int. Cl.
*H04M 3/493* (2006.01)
*H04M 3/22* (2006.01)

(52) U.S. Cl.
CPC ......... *H04M 3/493* (2013.01); *H04M 3/2227* (2013.01)

(58) Field of Classification Search
CPC .... H04M 1/575; H04M 1/576; H04M 1/6091; H04M 1/64; H04M 1/645; H04M 1/65;
(Continued)

(56) References Cited

U.S. PATENT DOCUMENTS 7,228,145 B2 * 6/2007 Burritt .................... H04W 4/24
455/445
8,150,020 B1 * 4/2012 Blanchard ............. H04M 3/493
379/265.03
(Continued)

FOREIGN PATENT DOCUMENTS

CN          108076235 B  * 10/2020    ............ H04M 3/362

OTHER PUBLICATIONS

"Customer Intent Analytics," Voziq, (5 pages). [Article, Online]. [Retrieved from the Internet Feb. 17, 2021] <URL: http://voziq.com/customer-intent-analytics/>.
(Continued)

*Primary Examiner* — Akelaw Teshale
(74) *Attorney, Agent, or Firm* — Alston & Bird LLP

(57) ABSTRACT

Embodiments of the present disclosure provide methods, apparatus, systems, computing devices, and/or computing entities for processing a call drop likelihood prediction for an interactive call data object. In accordance with one embodiment, a method is provided that includes: identifying a group of interactive call feature data objects associated with the interactive call data object that comprises an interactive call audio data object and an interactive call metadata object; processing the call feature data objects using a real-time call monitoring machine learning framework to generate the prediction by: processing the call audio data object using an audio data processing machine learning model to generate an audio-based embedding data object, processing the call audio data object using an audio transcript processing machine learning model to generate a transcript-based embedding data object, and generating the prediction based at least in part on the audio-based and transcript-based embedding data objects and the metadata object.

20 Claims, 7 Drawing Sheets

(58) Field of Classification Search
CPC ...... H04M 1/652; H04M 1/656; H04M 1/675; H04M 1/677; H04M 1/6775; H04M 1/72412; H04M 1/72415; H04M 1/72424; H04M 1/72454; H04M 1/7246; H04M 1/72484; H04M 11/002; H04M 11/022; H04M 11/08; H04M 15/44; H04M 15/49; H04M 15/50; H04M 15/57; H04M 15/63; H04M 15/705; H04M 15/745; H04M 15/774; H04M 15/8292; H04M 15/84; H04M 15/848; H04M 15/85; H04M 15/858; H04M 17/103; H04M 17/106; H04M 17/204; H04M 19/02; H04M 19/045; H04M 2017/12; H04M 2017/14; H04M 2017/24; H04M 2201/41; H04M 2203/2005; H04M 2203/2072; H04M 2203/402; H04M 2203/405; H04M 2203/4563; H04M 2203/5009; H04M 2203/5027; H04M 2203/555; H04M 2215/0104; H04M 2215/0108; H04M 2215/0148; H04M 2215/0184; H04M 2215/208; H04M 2215/34; H04M 2215/44; H04M 2215/46; H04M 2215/66; H04M 2215/7009; H04M 2215/7272; H04M 2215/7442; H04M 2215/7464; H04M 2215/81; H04M 2215/8129; H04M 2215/82; H04M 2250/02; H04M 2250/10; H04M 2250/22; H04M 3/002; H04M 3/16; H04M 3/20; H04M 3/301; H04M 3/323; H04M 3/362; H04M 3/42127; H04M 3/42136; H04M 3/42212; H04M 3/42272; H04M 3/42306; H04M 3/424; H04M 3/4286; H04M 3/4288; H04M 3/44; H04M 3/4933; H04M 3/5234; H04M 3/5236; H04M 3/543; H04M 3/562; H04M 3/563; H04M 3/564; H04M 7/0012; H04M 7/0036; H04M 7/0039; H04M 7/0042; H04M 7/0078; H04M 7/0081; H04M 7/121; H04M 7/123; H04M 7/1255; H04M 7/127; H04M 7/1285; H04M 7/129; H04M 9/027

See application file for complete search history.

(56) References Cited

U.S. PATENT DOCUMENTS

| | | | |
|---|---|---|---|
| 8,767,927 B2 | 7/2014 | Springer | |
| 9,495,331 B2 | 11/2016 | Govrin et al. | |
| 9,495,962 B2 | 11/2016 | Govrin et al. | |
| 9,552,812 B1 | 1/2017 | Ouimette et al. | |
| 9,712,671 B2 | 7/2017 | Monegan et al. | |
| 9,742,912 B2 | 8/2017 | Srivastava et al. | |
| 10,565,509 B2 | 2/2020 | London | |
| 2004/0235509 A1* | 11/2004 | Burritt | H04W 4/24 455/518 |
| 2009/0247137 A1* | 10/2009 | Awad | H04W 4/02 455/418 |
| 2012/0213341 A1* | 8/2012 | Jaiswal | H04M 3/493 379/88.01 |
| 2014/0179279 A1* | 6/2014 | Skeba | H04W 48/16 455/414.1 |
| 2015/0168164 A1* | 6/2015 | Patil | H04W 4/029 455/421 |
| 2016/0057383 A1* | 2/2016 | Pattan | H04L 65/762 348/14.03 |
| 2018/0139324 A1* | 5/2018 | Pearce | G06Q 30/01 |
| 2019/0320067 A1* | 10/2019 | Pearce | H04M 3/493 |
| 2019/0342452 A1 | 11/2019 | Strong et al. | |
| 2020/0082810 A1 | 3/2020 | Kneller et al. | |

OTHER PUBLICATIONS

Khudyakov, Polyna et al. "Designing a Call Center With an IVR (Interactive Voice Response)," Queueing Systems, vol. 66, No. 3, Oct. 14, 2010, (23 pages). DOI: 10.1007/s11134-010-9193-y.

Tezcan, Tolga et al. "Robust Design and Control of Call Centers With Flexible Interactive Voice Response Systems," Manufacturing & Service Operations Management, vol. 14, No. 3, May 4, 2012, pp. 386-401. DOI: 10.1287/msom.1120.0378. ISSN: 1523-4614 (print). ISSN: 1526-5498 (online).

* cited by examiner

CONFORMATIONAL FRAMEWORK FOR CALL DROP LIKELIHOOD FROM INTERACTIVE VOICE RESPONSE SYSTEM

TECHNOLOGICAL FIELD

Embodiments of the present disclosure generally relate to a technology framework for predicting that a party (e.g., a caller) who is on a voice call interacting with an interactive voice response system is likely to drop the voice call before solving a query so that one or more actions can be taken to avoid the party from dropping the voice call.

BACKGROUND

A need exists in the industry to address technical challenges related to predicting that a party who is on a voice call interacting with an interactive voice response system is likely to drop the voice call before solving a query. Predicting that a party is likely to drop the voice call allows for one or more actions to be taken to avoid the party from dropping the voice call, and as a result avoid unresolved voice calls. It is with respect to these considerations and others that the disclosure herein is presented.

BRIEF SUMMARY

In general, embodiments of the present disclosure provide methods, apparatus, systems, computing devices, computing entities, and/or the like for processing a call drop likelihood prediction for an interactive call data object. In accordance with one aspect of the disclosure, a method for processing a call drop likelihood prediction for an interactive call data object is provided. In various embodiments, the method includes: identifying a group of interactive call feature data objects associated with the interactive call data object, where the group of interactive call feature data objects comprises an interactive call audio data object and an interactive call metadata object; processing the group of interactive call feature data objects using a real-time call monitoring machine learning framework to generate the call drop likelihood prediction, wherein processing the group of interactive call feature data objects using the real-time call monitoring machine learning framework comprises: processing the interactive call audio data object using an audio data processing machine learning model of the real-time call monitoring machine learning framework to generate an audio-based embedding data object of a plurality of inferred interactive call embedding data objects for the interactive call data object, processing the interactive call audio data object using an audio transcript processing machine learning model of the real-time call monitoring machine learning framework to generate a transcript-based embedding data object of the plurality of inferred interactive call embedding data objects for the interactive call data object, and generating the call drop likelihood prediction based at least in part on the plurality of inferred interactive call embedding data objects and the interactive call metadata object; and performing one or more prediction-based actions based at least in part on the call drop likelihood prediction.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: identify a group of interactive call feature data objects associated with the interactive call data object, where the group of interactive call feature data objects comprises an interactive call audio data object and an interactive call metadata object; process the group of interactive call feature data objects using a real-time call monitoring machine learning framework to generate the call drop likelihood prediction, wherein processing the group of interactive call feature data objects using the real-time call monitoring machine learning framework comprises: process the interactive call audio data object using an audio data processing machine learning model of the real-time call monitoring machine learning framework to generate an audio-based embedding data object of a plurality of inferred interactive call embedding data objects for the interactive call data object, process the interactive call audio data object using an audio transcript processing machine learning model of the real-time call monitoring machine learning framework to generate a transcript-based embedding data object of the plurality of inferred interactive call embedding data objects for the interactive call data object, and generate the call drop likelihood prediction based at least in part on the plurality of inferred interactive call embedding data objects and the interactive call metadata object; and perform one or more prediction-based actions based at least in part on the call drop likelihood prediction.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: identify a group of interactive call feature data objects associated with the interactive call data object, where the group of interactive call feature data objects comprises an interactive call audio data object and an interactive call metadata object; process the group of interactive call feature data objects using a real-time call monitoring machine learning framework to generate the call drop likelihood prediction, wherein processing the group of interactive call feature data objects using the real-time call monitoring machine learning framework comprises: process the interactive call audio data object using an audio data processing machine learning model of the real-time call monitoring machine learning framework to generate an audio-based embedding data object of a plurality of inferred interactive call embedding data objects for the interactive call data object, process the interactive call audio data object using an audio transcript processing machine learning model of the real-time call monitoring machine learning framework to generate a transcript-based embedding data object of the plurality of inferred interactive call embedding data objects for the interactive call data object, and generate the call drop likelihood prediction based at least in part on the plurality of inferred interactive call embedding data objects and the interactive call metadata object; and perform one or more prediction-based actions based at least in part on the call drop likelihood prediction.

In particular embodiments, the group of interactive call feature data objects may further comprise an interactive call event sequence descriptor data object. In these embodiments, processing the group of interactive call feature data objects using the real-time call monitoring machine learning framework may further comprise processing the interactive call event sequence descriptor data object using an event sequence processing machine learning model of the real-time call monitoring machine learning framework to generate an event-based embedding data object of the plurality of inferred interactive call embedding data objects for the interactive call data object. Accordingly, in some embodiments, the event sequence processing machine learning model may comprise one or more sequential processing layers. For instance, each sequential processing layer of the one or more sequential processing layers may be selected from a group consisting of a recurrent neural network layer and a gated recurrent unit layer.

In addition, in particular embodiments, the interactive call event sequence descriptor data object may describe an ordered sequence of one or more interactive call events. Here, each interactive call event of the one or more interactive call events may be selected from a group of candidate interactive call events, and the group of candidate interactive call events are associated with an interactive voice response system associated with the interactive call data object.

Further, in particular embodiments, the audio data processing machine learning model may comprise an audio transformation layer that is configured to process the interactive call audio data object to generate a transformed audio data object, and one or more sequential processing layers that are collectively configured to generate the audio-based embedding data object based at least in part on the transformed audio data object. In some embodiments, the audio data processing machine learning model may further comprise a convolutional layer that is configured to process the transformed audio data object to generate a convolutional output data object. In these embodiments, generating the audio-based embedding data object may be based at least in part on processing the convolutional output data object using the one or more sequential processing layers to generate the audio-based embedding data object. Furthermore, in particular embodiments, the audio transcript processing machine learning model may comprise a transcription layer that is configured to process the interactive call audio data object to generate an audio transcript data object, and one or more sequential processing layers that are collectively configured to generate the transcript-based embedding data object based at least in part on the audio transcript data object. In some embodiments, the interactive call metadata object may comprise one or more caller identifier descriptor data objects that describe one or more caller identifier features associated with a caller identifier profile for the interactive call data object. Finally, in particular embodiments, generating the call drop likelihood prediction based at least in part on the plurality of inferred interactive call embedding data objects and the interactive call metadata object may involve processing the plurality of inferred interactive call embedding data objects and the interactive call metadata object using a feature merger machine learning model to generate a merged feature data object, processing the merged feature data object using a dense processing machine learning model to generate a dense model output data object, and generating the call drop likelihood prediction based at least in part on the dense model output data object.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
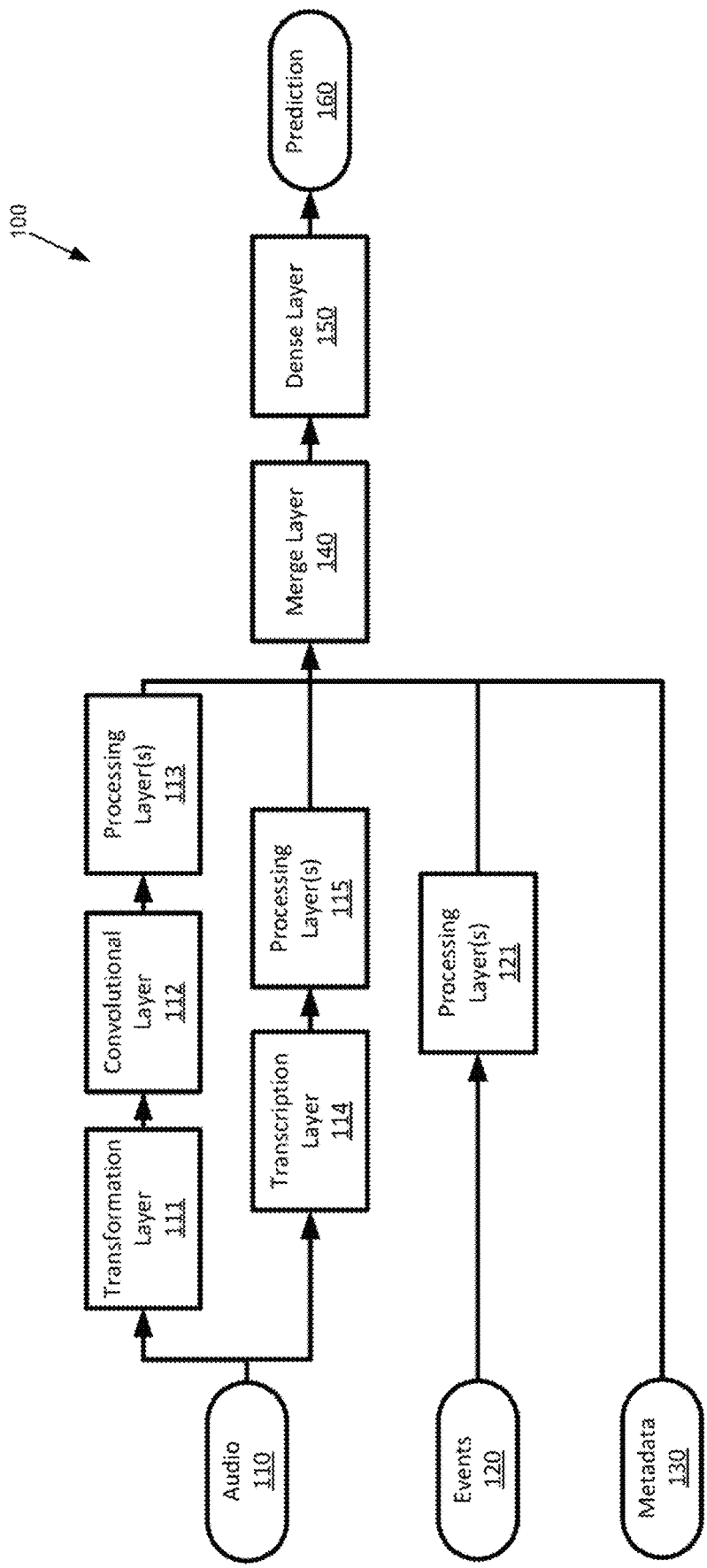
FIG. 1 is a real-time call monitoring machine learning framework in accordance with various embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "interactive call data object" may refer to a data object representing a voice call being conducted between two or more parties, e.g., between a party and an automated voice response system (IVR). For instance, in various embodiments, the voice call may involve a party interacting with an IVR within a contact center environment. Accordingly, the IVR may provide the party with different actions (e.g., prompts) that the party may engage in, as well as provide and request different information, in order to successfully navigate through the IVR and reach a solution to a query. For example, the solution to the query may involve obtaining information on an online purchase the party has made with an entity that is associated with the contact center. Accordingly, various embodiments of the present invention involve predicting whether the party is likely to drop (e.g., hang up) a voice call prior to successfully reaching the solution to the query. In addition, embodiments of disclosure entail taking one or more appropriate actions to avoid call abandonment by the party if the party is predicted to likely drop the voice call.

The term "interactive call feature data object" may refer to a data object representing a feature collected, acquired, identified, measured, generated, and/or the like (aka, identified) for a voice call associated with an interactive call data object. In various embodiments, a group of interactive call feature data objects may be identified for the voice call that can then be processed in order to predict whether a party involved in the voice call is likely to drop the call before successfully reaching a solution to a query. For example, the voice call and the query may involve the party interacting with an IVR to perform some action (e.g., pay a bill) or gather some type of information (e.g., status of a purchase order). Accordingly, in particular embodiments, the group of interactive call feature data objects may be identified in real time as the party navigates through the IVR so that the prediction can be made in real time. In some embodiments, the group of interactive call feature data objects may include an interactive call audio data object. The interactive call audio data object may represent the audio of the communication. For example, the interactive call audio data object may be the audio input of the party over an audio channel or on an audio recording. In addition, in some embodiments, the group of interactive call feature data objects may include an interactive call metadata object. The interactive call metadata object may represent data related to the party and/or voice call such as, for example, identification data on the party, historical event data involving the party, historical data on past voice calls conducted with the party, and/or the like.

The term "real-time call monitoring machine learning framework" may refer to a combination of one or more machine learning models that are collectively used in various embodiments to generate a call drop likelihood prediction for a voice call represented by an interactive call data object. Here, the call drop likelihood prediction represents a likelihood of a party on the voice call dropping the call before solving a query. For instance, the voice call may involve the party on the call interacting with an IVR to attempt to solve some type of query such as, for example, attempting to place an order for a product through the IVR. In particular embodiments, a group of interactive call feature data objects for the party and/or voice call is identified that is then processed by the real-time call monitoring machine learning framework to generate the call drop likelihood prediction. Accordingly, in some embodiments, the real-time call monitoring machine learning framework includes one or more machine learning models configured to process the group of interactive call feature data objects to generate a call drop likelihood prediction. Here, the one or more machine learning models may be configured to process different types of data represented in the group of interactive call feature data objects. As discussed further herein, output generated from the one or more machine learning models may be combined through a merge layer and then processed through a dense layer to generate the call drop likelihood prediction for the voice call.

The term "audio transformation layer" may refer to a component configured in various embodiments to process the interactive call audio data object for a voice call and generate a transformed audio data object for the call. Accordingly, the transformed audio data object may represent one or more prosodic features of the audio for the voice call transformed into the frequency domain. For example, in particular embodiments, the audio transformation layer may involve generating a Fast Fourier Transform to convert one or more prosodic features, such as volume, pitch, intensity, intonation, stress, rhythm, and/or the like, represented in the interactive call audio data object from the time domain to the frequency domain. In some embodiments, the audio transformation layer may involve generating a spectrogram for the one or more prosodic features to provide a representation of the features in the frequency domain with respect to time.

The term "convolutional layer" may refer to a component configured in various embodiments to process the transformed audio data object for a voice call and generate a convolutional output data object. In particular embodiments, the convolutional layer creates a convolution kernel that is convolved with the audio data object (layer input) over a single spatial dimension (e.g., time) to produce the convolutional output data object. Accordingly, in some embodiments, the convolutional output data object may represent a vector having feature values extracted for the one or more prosodic features represented by the transformed audio data object.

The term "audio data processing machine learning model" may refer to a data object that describes parameters and/or hyper-parameters (e.g., defined operations) of a model configured for processing an interactive call audio data object for a voice call associated with an interactive call data object to generate an audio-based embedding data object for the interactive call audio data object. In particular embodiments, the audio data processing machine learning model may include one or more sequential processing layers that are collectively configured to generate the audio-based embedding data object. For instance, in some embodiments, the one or more sequential processing layers may be configured as a supervised or an unsupervised machine learning model. More specifically, in some embodiments, the one or more sequential processing layers may be configured as one or more deep learning models such as, for example, one or more conventional recurrent neural networks (RNNs), gated recurrent unit neural networks (GRUs), long short-term memory neural networks (LSTMs), and/or the like. In particular embodiments, the audio data processing machine learning model may include an audio transformation layer used to process the interactive call audio data object to generate a transformed audio data object. In these embodiments, the one or more sequential processing layers may be configured to generate the audio-based embedding data object based at least in part on the transformed audio data object. Further, in some embodiments, the audio data processing machine learning module may include a convolutional layer configured to process the transformed audio data object to generate a convolutional output data object. In some of the noted embodiments, the one or more sequential processing layers may be configured to process the convolutional output data object to generate the audio-based embedding data object. Accordingly, in various embodiments, the audio-based embedding data object serves a functional role within the real-time call monitoring machine learning framework to represent the relevant spectral features of a voice call over time, where the audio-based embedding data object can be used in predicting whether a party on the voice call is likely to drop the call before solving a query.

The term "transcription layer" may refer to a data object that describes parameters, hyper-parameters, and/or operations of a model configured for generating a transcript of the audio of a voice call. For instance, in particular embodiments, the transcription layer may be an automatic speech recognition (ASR) component configured to process the audio of the voice call and generate an audio transcript data object of the speech being spoken by a party on the voice call. For example, the audio transcript data object may be a text transcript of the speech being spoken by the party on the voice call. In some embodiments, the transcription layer may also be configured to perform one or more natural language processing operations on the audio and/or transcript of the voice call, such as a normalization operation, a tokenization operation, an embedding operation, and/or the like.

The term "audio transcript processing machine learning model" may refer to a data object that describes parameters and/or hyper-parameters (e.g., defined operations) of a model configured for processing the interactive call audio data object associated with an interactive call data object for a voice call to generate a transcript-based embedding data object. Similar to the audio data processing machine learning model, in particular embodiments, the audio transcript processing machine learning model may include one or more sequential processing layers that are collectively configured to generate the transcript-based embedding data object. For instance, in some embodiments, the one or more sequential processing layers may be configured as a supervised or an unsupervised machine learning model. More specifically, in some embodiments, the one or more sequential processing layers may be configured as one or more deep learning models such as, for example, one or more conventional RNNs, GRUs, LSTMs, and/or the like. In particular embodiments, the audio transcript processing machine learning model may include a transcription layer used to processes the interactive call audio data object to generate an audio transcript data object for the voice call. In these embodiments, the one or more sequential processing layers may be configured to generate the transcript-based embedding data object based at least in part on the audio transcript data object. Accordingly, in various embodiments, the transcript-based embedding data object serves in a functional role within the real-time call monitoring machine learning framework to represent the semantic features of a voice call over time, where the transcript-based embedding data object can be used in predicting whether a party on the voice call is likely to drop the call before solving a query.

The term "interactive call event sequence descriptor data object" may refer to a data object representing one or more recognized events that occur while a party is engaged in a voice call to solve a query. For instance, the voice call may involve the party interacting with an IVR to attempt to perform one or more tasks and/or acquire one or more pieces of information. Accordingly, in this example, the one or more events may represent the actions performed by the party while interacting with the IVR such as, for instance, selecting a prompt via a dual-tone multi-frequency (DTMF) input or via a voice input, providing particular information by the party, acquiring particular information by the party, and/or the like. In addition, the events may represent actions performed and/or information provided or acquired by the IVR or other backend system such as script execution, information acquisition, and/or communicating prompts to the party. In some embodiments, such actions may be referred to as interactive call events. For example, the actions may be one or more interactive call events that are selected from a group of candidate interactive call events that are associated with the IVR. Accordingly, in particular embodiments, the interactive call event sequence descriptor data object may comprise a vector of feature values representing the one or more events. In addition, in some embodiments, the interactive call event sequence descriptor data object may represent the one or more events in an ordered sequence in which they occurred during the voice call. In some embodiments, the interactive call event sequence descriptor data object may describe a timeseries of recognized events associated with a corresponding interactive call data object.

The term "event sequence processing machine learning model" may refer to a data object that describes parameters and/or hyper-parameters (e.g., defined operations) of a model configured for processing the interactive call event sequence descriptor data object associated with an interactive call data object for a voice call to generate an event-based embedding data object. In some embodiments, the event sequence processing machine learning model may include one or more sequential processing layers that are collectively configured to generate the event-based embedding data object. For instance, in some embodiments, the one or more sequential processing layers may be configured as a supervised or an unsupervised machine learning model. More specifically, in some embodiments, the one or more sequential processing layers may be configured as one or more deep learning models such as, for example, one or more conventional RNNs, GRUs, LSTMs, and/or the like. Accordingly, in various embodiments, the event-based embedding data object serves in a functional role within the real-time call monitoring machine learning framework to represent the features of events occurring for a voice call over time, where the event-based embedding data object can be used in predicting whether a party on the voice call is likely to drop the call before solving a query.

The term "inferred interactive call embedding data object" may refer to a data object representing the one or more features identified for a voice call involving a party who is interacting with an IVR. For example, the inferred interactive call embedding data object may represent a feature identified for a voice call such as a feature of the audio of the voice, the words spoken by the party during the voice call, the events that occur during the voice call, and/or the like. In various embodiments, a plurality of inferred interactive call embedding data objects may be identified for the voice call. For instance, in some embodiments, the plurality of inferred interactive call embedding data objects may include an audio-based embedding data object, a transcript-based embedding data object, and/or an event-based embedding data object. Accordingly, the plurality of inferred interactive call embedding data objects may be used in various embodiments in generating a call drop likelihood prediction for the voice call.

The term "feature merger machine learning model" may refer to a data object that describes parameters and/or hyper-parameters (e.g., defined operations) of a model configured for processing the plurality of inferred interactive call embedding data objects and the interactive call metadata object to generate a merged feature data object. For instance, in particular embodiments, the feature merger machine learning model may be configured to combine the plurality of inferred interactive call embedding data objects and the interactive call metadata into the merged feature data object via concatenation, integration, merger, hashing, and/or the like. For example, the plurality of inferred interactive call embedding data objects and interactive call metadata object may both comprise vectors of feature values, and the feature merger machine learning model may be configured to combine the feature values found in the vectors into a combined vector representing the merged feature data object. Thus, in some embodiments, the merged feature data object may be considered a vector of feature values representing different features of a voice call, events associated with the voice call, and/or attributes of the party on the voice call.

The term "dense processing machine learning model" may refer to a data object that describes parameters and/or hyper-parameters (e.g., defined operations) of a model configured for processing a merged feature data object for a voice call represented by an interactive call data object to generate a dense model output data object. Accordingly, in particular embodiments, the dense processing machine learning model may include one or more sequential processing layers configured as a supervised or an unsupervised machine learning model. For instance, in some embodiments, the one or more sequential processing layers may be configured as a fully-connected deep learning model such as, for example, a neural network having one or more fully-connected layers. Here, in particular embodiments, the dense processing machine learning model maps a plurality of inferred interactive call embedding data objects and interactive call metadata object for a voice call involving a party interacting with an IVR to a probability estimation describing the likelihood of the party dropping the voice call before reaching a conclusion to a query. Depending on the embodiment, the dense model output data object generated by the dense processing machine learning model may provide different representations of the probability estimation. For instance, in some embodiments, the dense model output data object may provide a probability on the party dropping the voice call. In other embodiments, the dense model output data object may provide a classification as to whether the party is likely to drop the voice call. Accordingly, in various embodiments, the dense output data object may be used in generating the call drop likelihood prediction for the voice call.

Overview

Embodiments of the disclosure provide a novel technology framework, referred to herein as a real-time monitoring machine learning framework, for identifying and using various features associated with a voice call involving a party interacting with an interactive voice response system (IVR) and generating predictions related to the likelihood of the party dropping (e.g., hanging up) the voice call before solving a query. For example, the voice call may involve a party who has called into a contact center to inquire about the status of an online purchase the party made from an entity (e.g., e-commerce vendor) associated with the contact center. Here, the party may have been routed to the IVR upon the contact center receiving the voice call. Accordingly, the party, IVR, and/or one or more backend systems may perform one or more actions as the party navigates through the IVR to solve his or her query of determining the status of his or her purchase order. For example, such actions may involve the party providing information such as his or her name or purchase order number, selecting one or more prompts, requesting to speak with an agent, and/or the like. In addition, such actions may involve the IVR running one or more scripts, prompting the party for information, providing one or more prompts for selection by the party, and/or the like. Further, such actions may involve one or more backend systems within the contact center performing tasks such as party identification, party authentication, order lookup, and/or the like.

As the party navigates through the IVR to solve his or her query, the party may become frustrated for one or more reasons. For example, the party may become frustrated because he or she cannot perform the proper actions to solve his or her query, or the party may become frustrated because of the amount of time spent trying to solve his or her query. Those of ordinary skill in the art can envision several scenarios that may lead to the party becoming frustrated as he or she navigates through the IVR. Therefore, the party may become so frustrated as to drop the call (e.g., hang up) before solving his or her query. This can lead to additional future calls from the party and/or the party may become unhappy with the entity, leading to the party not to shop with the entity in the future.

Therefore, turning now to FIG. 1, various embodiments of the disclosure provide a real-time call monitoring machine learning framework 100 that uses several different sources of data for the voice call in predicting whether the party is likely to drop the voice call before solving a query. Accordingly, the different sources of data may include the audio 110 of the voice call. In particular embodiments, the audio 110 may be processed to identify prosodic features of the audio 110 such as volume, pitch, intensity, intonation, stress, rhythm, and/or the like. For example, these prosodic features may be used to represent the sentiment being expressed by the party while on the voice call. In some embodiments, the framework 100 may include an audio transformation layer 111 configured for processing measurements taken for the prosodic features to transform such measurements from the time domain to the frequency domain. In addition, in some embodiments, the framework 100 may include a convolutional layer 112 configured to perform a convolution operation on the measurements of the prosodic features to identify patterns found within the measurements. Furthermore, the audio 110 of the voice call may be processed to identify semantic features of the words being spoken by the party on the voice call. Accordingly, the framework 100 may include a transcription layer 114 configured to process the audio 110 to produce a transcript of the audio 110.

Events 120 that occur while the party navigates through the IVR may also be a source of data for the voice call in particular embodiments. In these instances, the events 120 may include actions taken and/or information provided or requested by the party as he or she navigates through the IVR, as well as actions taken and/or information provided or requested by the IVR and/or a backend system. Furthermore, metadata 130 related to the party may also be a source of data in particular embodiments. Here, the metadata 130 may include, for example, data such as past call history for the party, demographics on the party, past event history (e.g., purchase history) for the party, and/or the like. Accordingly, in various embodiments, the different sources of data may be identified in a sequential fashion as the party navigates through the IVR and the voice call progresses.

The features of the audio 110 and events 120 are then processed in various embodiments of the framework 100 using various sequential processing layers 113, 115, 121 to generate embedding representations of the features. As discussed further herein, in some embodiments, these sequential processing layers 113, 115, 121 may be in the form on one or more types of machine learning models. In particular embodiments, the embedding representations may then be merged via a merge layer 140 of the framework 100 and processed using a dense layer 150 of the framework 100 to generate a call drop likelihood prediction 160 for the voice call. Accordingly, in some embodiments, one or more prediction-based actions may be carried out in response to the call drop likelihood prediction 160 indicating the party is likely to drop the voice call. For example, the voice call may be prioritized, transferred to a service specialist, immediately transferred to an agent, and/or the like in response to the call drop likelihood prediction 160 indicating the party is likely to drop the call.

Exemplary Technical Contributions

An interactive voice response system (IVR) is built on top of many telephone systems, software, databases, and/or the like and enables identification, segmentation, and routing of parties on voice calls to satisfy queries. For example, many contact centers make use of IVRs to initially field incoming voice calls to determine how the voice calls should be routed within the contact centers' systems. Therefore, an IVR oftentimes serves as the core interaction system for a party with an entity such as a contact center. For example, an IVR can use voice and/or keypad inputs from a party to identify the party, applicable policies, relevant information of previous calls, and/or status of related events and/or occurrences for the party (e.g., status of a purchase order) and based at least in part on the information gathered, perform certain actions and/or provide certain information for the party to enable the party to satisfy a query.

However, parties can oftentimes become frustrated as they navigate through an IVR to satisfy queries. For example, a party may become frustrated due to the amount of time needed to satisfy the query (e.g., reach an agent), lack of options provided by the IVR for satisfying the query, confusion caused due to lack of clarity provided by the IVR for actions needed by the party in satisfying the query, and/or the like. As a result, the frustration for a party may rise to a level at which point, the party drops (e.g., hangs up) the voice call without satisfying his or her query. As a result, the dropped voice call can lead to a subsequent call from the party and/or the party becoming so dissatisfied with the entity associated with the IVR that the party discontinues conducting interactions (e.g., business) with the entity. Thus, dropped voice calls by frustrated parties can lead to system inefficiencies, higher costs, and/or lower effectiveness due to having to handle repeated voice calls, losing parties' willingness to interactive with such systems, and ineffective IVR configurations.

Therefore, various embodiments of the disclosure provided herein address many of these technical disadvantages by recognizing voice calls that may have a likelihood of being dropped so that such voice calls can be handled in a manner to avoid them from being dropped, thus avoiding the system inefficiencies, higher costs, and/or lower effectiveness experienced due to dropped voice calls. Specifically, embodiments of the disclosure provide a novel technology framework that can identify voice calls with a likelihood of being dropped in real time so that such calls can be handled to avoid them from being dropped. Accordingly, embodiments of the disclosure overcome many of the technical disadvantages of conventional IVRs that oftentimes lead to dropped voice calls.

In addition, the machine learning models used in various embodiments in identifying voices calls that are likely to be dropped can provide technical advantages that allow for such models to process various features of voice calls to accurately predict which voice calls are likely to be dropped. Specifically, various embodiments of the disclosure make use of distinct processing layers that allow for feature values to be identified for voice calls from different sources that improve the accuracy and precision of predicting the likelihood of such calls being dropped. Such processing layers include an audio transformation layer, a convolutional layer, a transcription layer, sequential processing layers, a merger layer, and a dense layer. Unique combinations of such layers found in various embodiments allow for embedding representations of various features of the voice calls to be generated and used in accurately predicting which of the voice calls are likely to be dropped.

Furthermore, the machine learning models used in various embodiments carry out complex mathematical operations in identifying voice calls that are likely to be dropped. Accordingly, the inventive solution provided herein can reduce the computational load of various systems by avoiding dropped voice calls, while marginally affecting the effective throughput of these systems. Furthermore, various embodiments of the present disclosure enhance the efficiency and speed of various computing systems by providing the ability to computationally manage voice calls in automated response systems in an efficient manner, and make important contributions to the various computational tasks that utilize real-time/expedited processing of voice calls to allow parties involved in the calls to satisfy queries. In doing so, various embodiments of the present disclosure make major technical contributions to improving the computational efficiency and reliability of various automated systems and procedures for carrying out these tasks. This in turn translates to more computationally efficient software systems.

Moreover, various embodiments of the present invention increase efficiency of IVRs by reducing computational loads on the noted systems. By disclosing reliable and efficient techniques for generating call drop likelihood predictions, various embodiments of the present invention enable performing prediction-based actions that reduce the likelihood of call drop, which in turn enables reducing attempts to make repeat calls. By reducing repeat call attempts, the noted embodiments of the present invention reduce the communication load on IVRs, which in turn reduces the IVR resource utilization and improves the resource efficiency of various IVRs. Moreover, by reducing IVR resource utilization, various embodiments of the present invention increase the effective throughput of IVRs.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Contact Center Architecture

Figure 2:
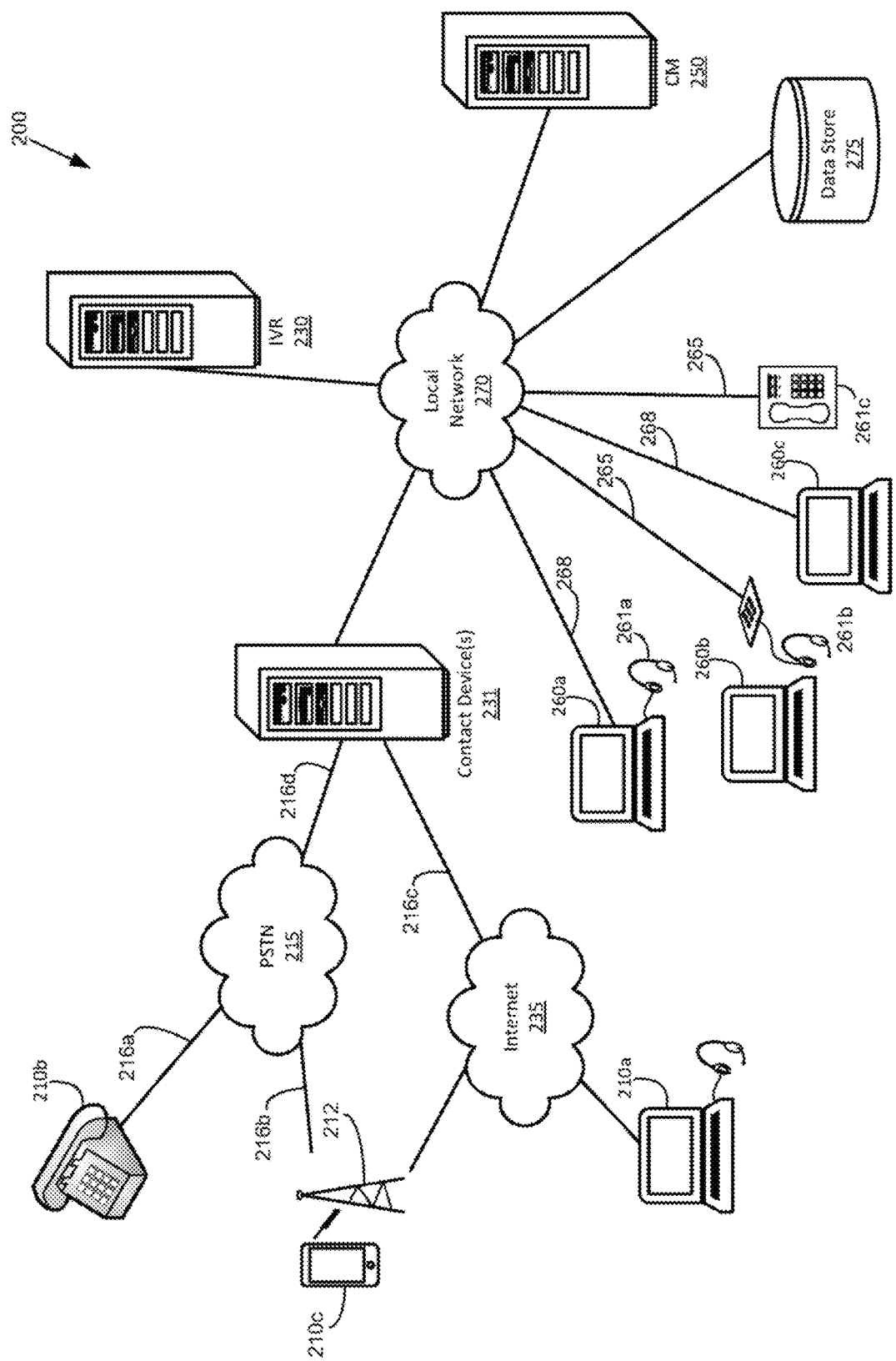
FIG. 2 is a diagram of a contact center architecture that can be used in conjunction with various embodiments of the present disclosure.

FIG. 2 provides an illustration of a contact center architecture 200 that may be used in accordance with various embodiments of the disclosure. The contact center architecture 200 shown in FIG. 2 may process various channels of communication such as audio (voice) calls, video calls, facsimiles, emails, text messages, Web chat sessions, and/or the like that can be inbound-only, outbound-only, or a combination of both (sometimes referred to as a "blended" contact center). In particular instances, the contact center may be referred to as a call center. However, for purposes of this disclosure, the term "contact center" is used throughout, although it is understood that the two are synonymous. Here, a communication represents an interaction taking place between a party and the contact center (e.g., component within the contact center and/or agent who is employed by the contact center).

In some embodiments, the contact center may handle communications originating from a remote party or initiated to a remote party. Thus, the term "party," without any further qualification, refers to an individual associated with a communication processed by the contact center, where the communication is either received from or placed to the party. For example, the party may simply be a caller who has placed a called into the contact center.

Depending on the embodiment, communications may originate to or be received from parties that use a variety of different devices. For instance, a party may receive or place a voice call using a conventional analog telephone 210b connected to a public switched telephone network ("PSTN") 215 using an analog plain old telephone service ("POTS") line 216a. The call may be routed by the PSTN 215 and may comprise various types of facilities 216d, including, but not limited to: T1 trunks, SONET based fiber optic networks, ATM networks, and/or the like. Various types of routers, switches, bridges, gateways, and other types of equipment may be involved in the processing of the calls.

In addition, a party may receive or place a communication using a device such as a desktop or laptop computer 210a, a smart phone 210c, mobile phone, tablet, or other mobile device. Depending on the device, these communications may be placed or received via an Internet provider 235 and/or wirelessly via a mobile service provider ("MSP") 212. For instance, communications may be routed to the PSTN 215 using an integrated services digital network ("ISDN") interface 216b or other type of interface that is well known to those skilled in the art. While in other instances, the MSP 212 may route communications as packetized data to/from an Internet provider 235 using Internet-based protocols. For convenience, unless indicated otherwise, the term "trunk" refers to any type of facilities (e.g., lines 216a, 216b, 216c, 216d) providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 231 for initiating and receiving communications based at least in part on the channel of communication. For instance, in various embodiments, communications such as inbound calls are received from parties by a contact device 231 such as an automatic call distributor ("ACD"). In particular embodiments, the ACD may be a specialized switch for receiving and routing inbound calls under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call over contact center facilities 265, 268 to an available agent. Depending on the embodiment, the facilities 265, 268 may be any suitable technology for conveying the call, including but not limited to a local area network ("LAN"), wide area network ("WAN"), ISDN, and/or conventional TDM circuits. The exact details typically depend in part on the technology used. For example, in one embodiment, first facilities 265 may be analog or proprietary voice communication technology whereas second facilities 268 may be SIP oriented. As may be appreciated, there are various technologies and configurations that are possible. In addition, the facilities 265, 268 may be the same or different from the facilities used to transport the call and/or message to the ACD.

Depending on the embodiment, the ACD may place a call in a queue if there is no suitable agent available. As already noted, the ACD in various embodiments routes a call initially to an interactive voice response component ("IVR") 230. As discussed further herein, the IVR 230 may provide prompts (prompt information data objects) to the party on the call. In particular instances, these prompts may solicit information from the party and the IVR 230 may collect and analyze responses from the party in the form of dual-tone multiple frequency ("DMTF") tones and/or speech. In addition, the IVR 230 may be used to identify metadata, such as, for example, prompting the party to provide account information or otherwise obtain information used to service the call. Further, in particular embodiments, the IVR 230 may interact with other components, such as a data store 275 and/or other backend system, to retrieve or provide information for processing the call.

Continuing on, in various embodiments, communications such as outbound calls may be sent using another contact device 231 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls to multiple telephone numbers simultaneously with the expectation that agents will be available to handle one or more of the calls that are answered. In various embodiments, the predictive dialer makes use of one or more algorithms to determine how and when to dial/text numbers so as to minimize the likelihood of a party being placed in a queue while maintaining target agent utilization.

Once a call is answered by a party, the dialer may connect the call initially to the IVR 230 and then to an available agent using one or more facilities 265, 268. Other types of dialing methods may be used such as preview dialing in which information about an account is displayed to an agent to review prior to the dialer originating a call to the account. In this way, when the party answers the call, the agent can interact with the party in an effective way. Further, in particular embodiments, the dialer may be configured so that it attempts to establish communication with parties using a calling list of telephone numbers that is stored in a data store 275.

Depending on the embodiment, other contact devices 231 may be used for originating and/or receiving other channels of communication such as Web chats, emails, text messages, and/or the like. For example, the contact center may make use of a web server to host Web pages and interact with parties via Web chats. In addition, the contact center may make use of an email server to receive and send emails from parties. While in other embodiments, the contact center may convey and/or receive text messages to/from a gateway instead of an ACD or dialer, which then conveys the messages to the Internet provider 235 and on to a MSP 212. In these particular embodiments, such a gateway may provide a way for the contact center to send and/or receive text messages that are not in a native text protocol and can be accepted or conveyed by the MSP 212.

Again, information associated with these other channels of communication may be stored in the data store 275. In addition, like calls, a transfer-like operation may be used in various embodiments to connect a communication that has been answered and/or received with an automated prompt system and/or available agent, or if an agent is not available, a queueing operation may be used to place the communication in a queue until an agent is available.

Accordingly, in various embodiments, the contact center may make use of a communication monitoring component ("CM") 250 to monitor communications and to direct the contact devices 231 on routing communications to various components, queues, and/or agents. Depending on the embodiment, the CM 250 may keep track of the availability of various components, as well as which agents who are available to handle communications and what channels of communications these agents are able to handle.

An agent at the contact center typically uses a computing device 260a-260c, such as a personal computer, and a voice device 261a-261c to handle communications. The combination of computing device 260a-260c and voice device 261a-261c may be referred to as a "workstation." However, in particular embodiments, the computing device 260a-260c may also handle voice (e.g., VoIP) or voice capabilities may not be needed so that reference to an agent's "workstation" may only refer to a computing device 260a-260c without the use of a separate voice device 261a-261c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 231) may queue the communication for the next available suitable agent.

Depending on the embodiment, interaction between a contact device 231, as well as other components within the contact center architecture 200, and agent's workstation may involve using a local area network ("LAN") 270. In addition, in particular embodiments, an agent may interact with components that provide information to the agent's workstation. For example, when a communication is directed to an agent, information above the party on the communication may be presented to the agent's computing device 260a-260b over the LAN 270 using facilities 268.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 200 is configured to be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must actually be located in a contact center location or controlled by a contact center operator. In addition, depending on the embodiment, the agent positions may be remotely located from the other components of the contact center, sometimes referred to as a "virtual contact center." Those skilled in the art will recognize FIG. 2 represents one possible configuration of a contact center architecture 200, and variations are possible with respect to the protocols, facilities, components, technologies, and equipment used.

Exemplary Computing Entity

Figure 3:
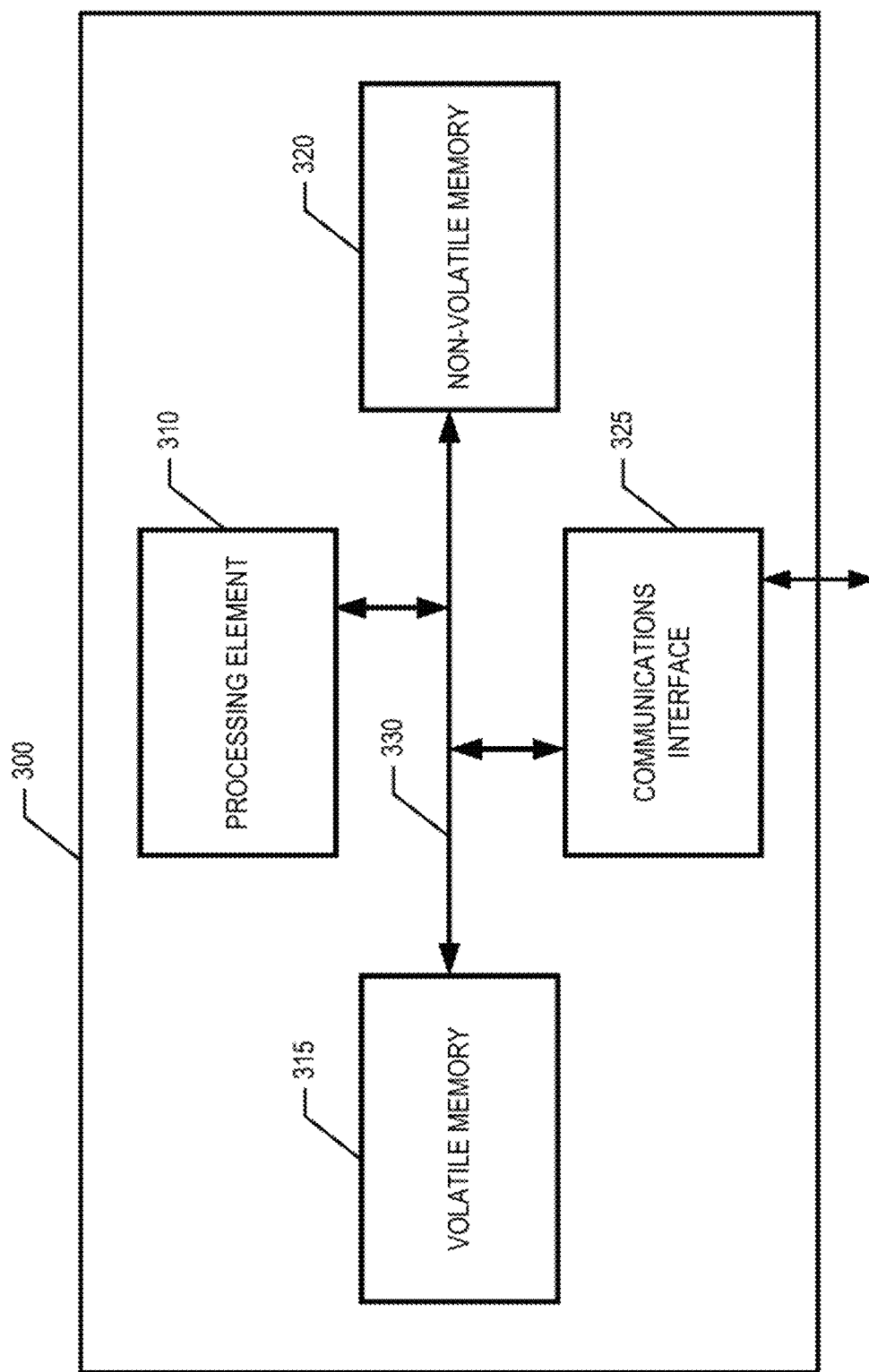
FIG. 3 is a schematic of a computing entity that may be used in conjunction with various embodiments of the present disclosure.

FIG. 3 provides a schematic of a computing entity 300 that may be used in accordance with various embodiments of the present disclosure. For instance, the computing entity 300 may be one or more of the components previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The terms database, database instance, database management system entity, and/or similar terms used herein interchangeably and, in a general sense, to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Voice Call Processing Module

Figure 4:
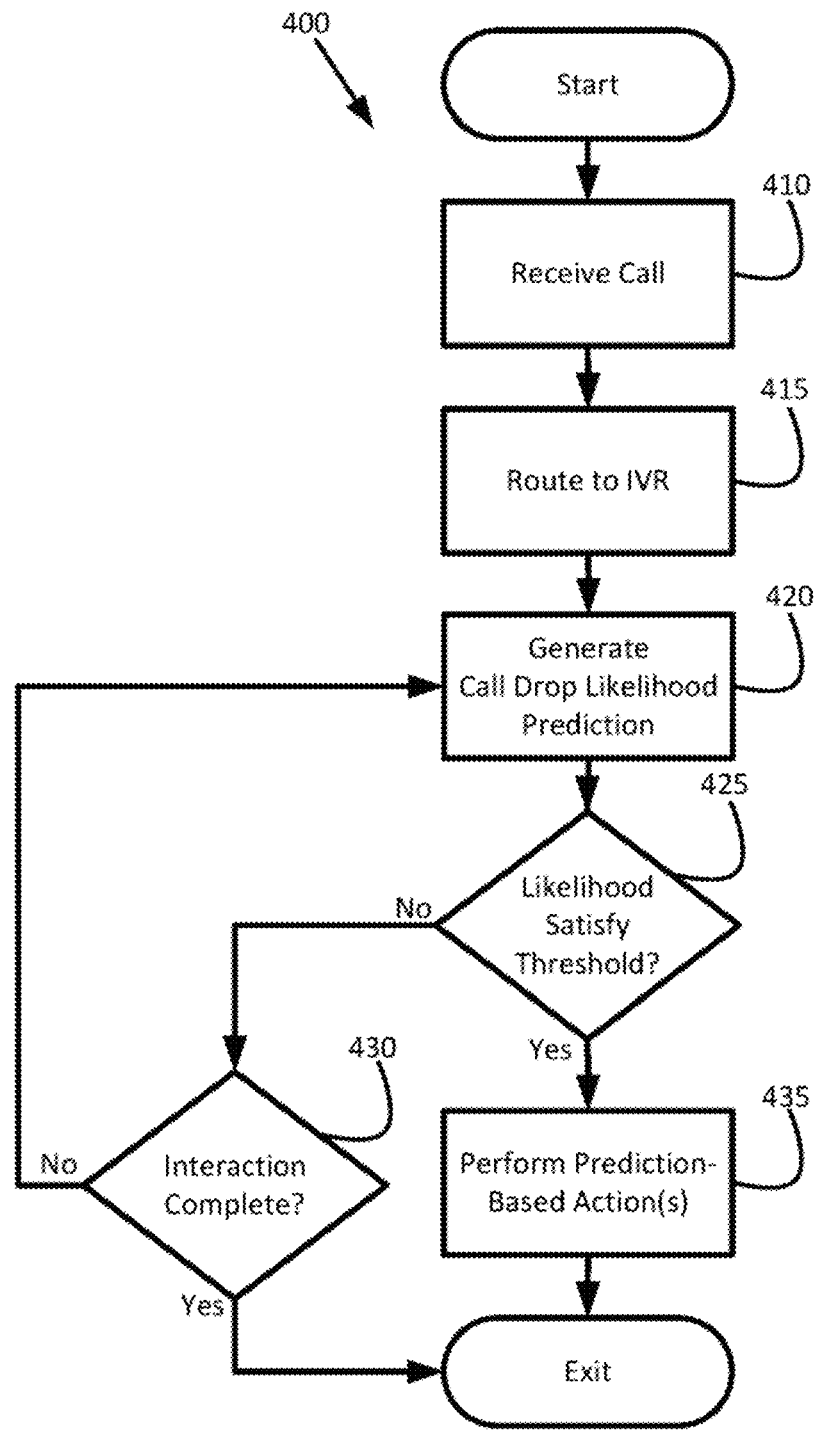
FIG. 4 is a process flow for processing a voice call routed to an interactive voice response system in accordance with various embodiments of the present disclosure.

Turning now to FIG. 4, additional details are provided regarding a process flow for processing a voice call routed through an IVR 230 according to various embodiments. FIG. 4 is a flow diagram showing a voice call processing module for performing such functionality according to various embodiments of the disclosure. For example, the flow diagram shown in FIG. 4 may correspond to operations carried out by a processing element 310 in a computing entity 300, such as the CM 250 described in FIG. 2, as it executes the voice call processing module stored in the computing entity's volatile and/or nonvolatile memory.

The process flow 400 begins in various embodiments with the voice call processing module receiving a voice call in Operation 410. Here, in particular embodiments, the voice call processing module may receive a notification of the voice call. For example, the voice call may be inbound call received by a contact center from a party (e.g., a caller) or the voice call may be an outbound call placed to a party who has answered the call.

Accordingly, the voice call processing module routes the voice call to an IVR 230 in Operation 415. Here, the voice call processing module may route the voice call to the IVR 230 for any number of different reasons. For example, the voice call processing module may route the voice call to the IVR 230 to gather information from the party on the call to determine how to further the route the call. For instance, the contact center may handle voice calls for an entity involving placing orders for products and providing technical support for the products. Therefore, the voice call processing module may route the voice call to the IVR 230 to determine whether the voice call should be routed to an agent handling the placing of orders or an agent handling technical support.

Once routed to the IVR 230, the IVR 230 may interact with the party on the voice call to facilitate satisfying a query for the party. For example, the query may involve the party wishing to place an order for a product. Here, the IVR 230 may be configured to gather initial information from the party and then route the voice call to an agent who then uses the initial information and converses with the party to complete placing the order for the product. While in another instance, the IVR 230 may be configured to gather information from the party and run one or more scripts to enable the party to place the order for the product without having to involve an agent. Those of ordinary skill in the art can envision several different scenarios involving the interaction taking place between the party on the voice call and the IVR 230.

As the party interacts with the IVR 230, the voice call processing module generates a call drop likelihood prediction 160 for the voice call in Operation 420. Accordingly, in various embodiments, the voice call processing module generates the call drop likelihood prediction 160 by invoking a call drop prediction module. As detailed further herein, the call drop prediction module generates the call drop likelihood prediction 160 for the voice call based at least in part on various features identified for the voice call. For instance, in some embodiments, features may be identified from the audio of the voice call such as prosodic features measured for the audio and/or semantic features based at least in part on the words spoken by the party on the voice call. In addition, features may be identified from events that occur while the party is navigating through the IVR 230 such as, for example, events involving the party providing and/or acquiring information, the party performing actions such as selecting prompts, the IVR 230 requesting and/or providing information to the party, the IVR 230 performing actions such as running scripts and/or providing prompts, backend systems performing actions such as verifying and/or authenticating the identity of the party, and/or the like. Further, features may be identified from metadata associated with the party such as, for example, demographics on the party, event and/or call history for the party, and/or the like.

Thus, in various embodiments, the call drop prediction module returns the call drop likelihood prediction 160 to the voice call processing module and the voice call processing module determines whether the call drop likelihood prediction 160 satisfies a threshold in Operation 425. For example, in particular embodiments, the call drop likelihood prediction 160 may provide a probability value on the likelihood of the party dropping the voice call before satisfying a query. Therefore, in this example, the voice call processing module may determine whether the probability value is over a threshold value. In other embodiments, the call drop likelihood prediction 160 may provide a classification identifier that indicates whether the party is likely to drop the voice call or not. Therefore, the voice call processing module may determine whether the classification identifier satisfies the threshold of indicating the party is likely to drop the voice call. In addition, in some embodiments, the call drop likelihood prediction 160 may also provide other information such as a prediction on an amount of time and/or the time at which the party is likely to drop the voice call. Such information may be helpful in determining what prediction-based actions should be carried out to address a prediction that the party is likely to drop the voice call.

If the voice call processing module determines the call drop likelihood prediction 160 does not satisfy the threshold, then the voice call processing module determines whether the party is continuing to interact with the IVR 230 in Operation 430. If so, then the voice call processing module returns to Operation 420 and generates another call drop likelihood prediction 160 for the voice call. Therefore, in various embodiments, the voice call processing module is configured to re-evaluate the party's likelihood of dropping the voice call before satisfying his or her query as the party continues to interact with the IVR 230. Such a configuration allows the framework to repeatedly update the prediction on the likelihood of the party dropping the voice call as new data from the various sources is generated. Thus, the framework is configured in various embodiments to consider the sequence of features associated with the party and voice call as the voice call progresses so that the prediction on the likelihood of the party dropping the voice call can be updated accordingly.

However, if the voice call processing module determines the call drop likelihood prediction 160 satisfies the threshold, then the voice call processing module performs one or more prediction-based actions to address the likelihood of the party dropping the voice call in Operation 435. Here, depending on the embodiment, the voice call processing module may be configured to carry out any number of different prediction-based actions to address the likelihood of the party dropping the voice call before satisfying his or her query. For example, the voice call processing module may be configured to transfer the voice call to a specialist who is trained to handle such calls, prioritize the voice call in a queue so that the call can be handled quickly, notify one or more personnel and/or systems of the likelihood of the party dropping the call so that it may be addressed promptly, notify an agent of the likelihood of the party dropping the voice call as the agent answers the call, immediately transfer the voice call to an agent identified as best to handle the call, and/or the like. Those of ordinary skill in the art can envision other prediction-based actions that can be performed in light of this disclosure. Accordingly, many of the prediction-based actions that are performed are to attempt to mitigate the likelihood of the party dropping the voice call.

Call Drop Prediction Module

Figure 5:
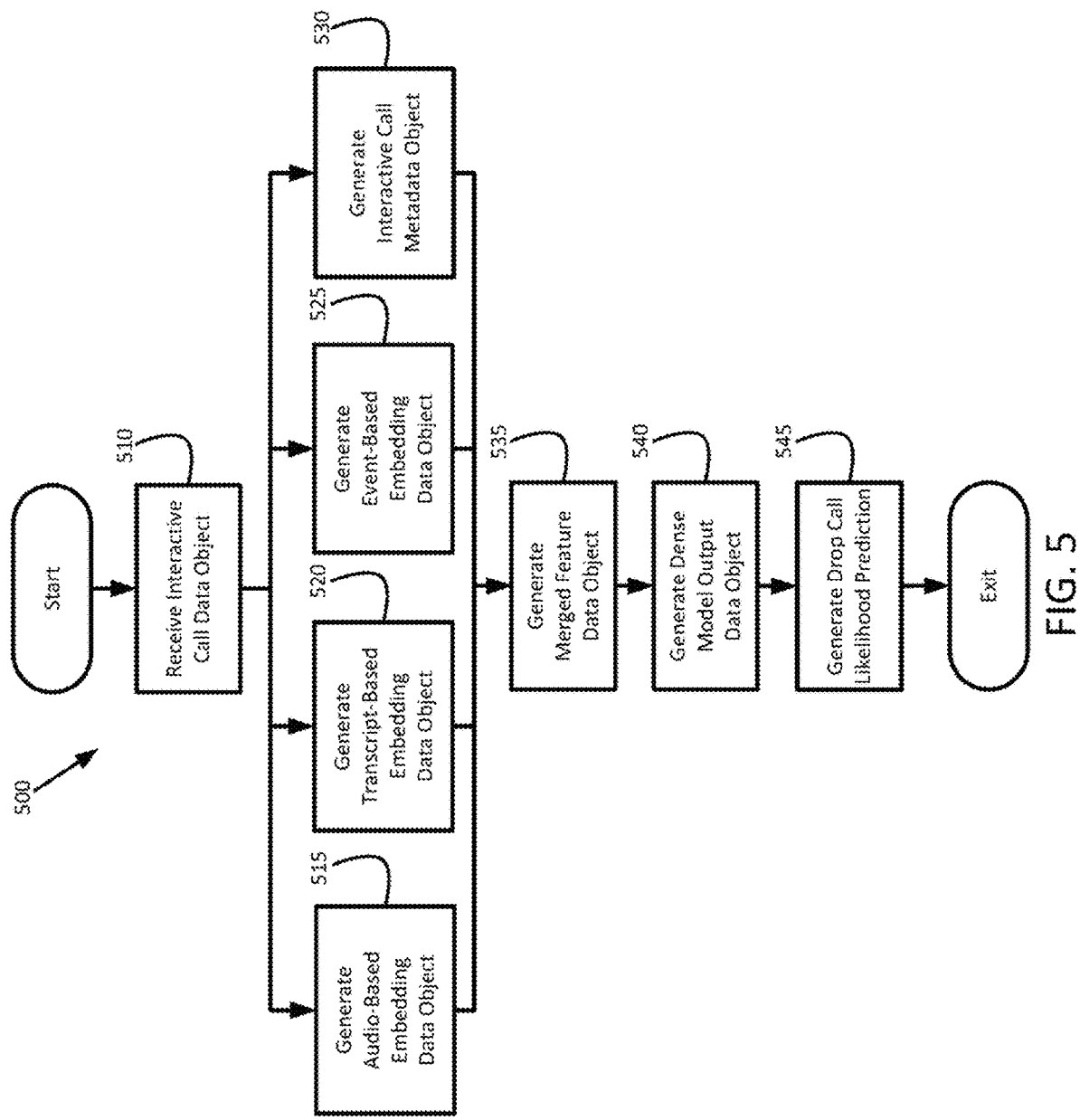
FIG. 5 is a process flow for generating a call drop likelihood prediction for a voice call routed to an interactive voice response system in accordance with various embodiments of the present disclosure.

Turning now to FIG. 5, additional details are provided regarding a process flow for generating a call drop likelihood prediction 160 for a voice call routed through an IVR 230 according to various embodiments. As discussed further herein, the process flow shown in FIG. 5 is configured in various embodiments based at least in part on a real-time call monitoring machine learning framework 100 used in generating the call drop likelihood prediction 160 for the voice call. Thus, FIG. 5 is a flow diagram showing a call drop prediction module for performing functionality according to embodiments of the framework 100. For example, the flow diagram shown in FIG. 4 may correspond to operations carried out by a processing element 310 in a computing entity 300, such as the CM 250 described in FIG. 2, as it executes the call drop prediction module stored in the computing entity's volatile and/or nonvolatile memory.

As previously noted, the call drop prediction module may be invoked in particular embodiments by the voice call processing module for a particular voice call as the party on the voice call interacts with an IVR 230. Accordingly, in some embodiments, the call drop prediction module may be invoked numerous times as the party interacts with the IVR 230 so that an updated call drop likelihood prediction 160 can be generated for the voice call. However, with that said, the call drop prediction module in other embodiments may be invoked by a different module, or may be executed as a stand-alone module for generating the call drop likelihood prediction 160 for a voice call.

The process flow 500 begins in various embodiments with the call drop prediction module receiving an interactive call data object related to a voice call in Operation 510. Here, depending on the embodiment, the call drop prediction module may receive the interactive call data object from a module that has invoked the call drop prediction module, or the call drop prediction module may receive the interactive call data object by retrieving the interactive call data object from a source such as data store 275. Accordingly, the interactive call data object may identify the associated voice call, as well as the party involved in the voice call. In addition, the interactive call data object may identify features for the voice call such as, for example, the voice call involves a customer service call. Further, the interactive call data object may identify the current progress of the voice call, as well as any associated data objects representing features of the voice call that have been generated.

At this point, the call drop prediction module is configured in various embodiments to generate one or more embedding data objects for the voice call. As explained further herein, these embedding data objects serve in functional roles within the real-time call monitoring machine learning framework 100 to represent relevant features of the party and voice call over time that are used in predicting whether the party on the voice call is likely to drop the call before solving a query.

Therefore, in particular embodiments, the call drop prediction module generates an audio-based embedding data object in Operation 515. The audio-based embedding data object represents relevant spectral features of the voice call over time that can be used in predicting whether the party on the voice call is likely to drop the call before solving the query. Accordingly, in some embodiments, the call drop prediction module is configured to generate the audio-based embedding data object by invoking an audio data processing module. In turn, the audio data processing module is configured to extract values for one or more prosodic features of the audio of the voice call that serve as interactive call feature data objects. For example, the one or more prosodic features may include such features as volume, pitch, intensity, intonation, stress, rhythm, and/or the like. Prosodic features can oftentimes reflect various expressions of the party such as emotional state of the party, the form of speech being spoken by the party such as a statement, question, command, and/or the like, the presence of irony or sarcasm, emphasis, contrast, and/or focus. Therefore, prosodic features can be used to reflect elements of spoken words that may not necessarily be encoded by grammar or choice of vocabulary.

In various embodiments, the audio data processing module is configured to process the group of values for the prosodic features using an audio data processing machine learning model to generate the audio-based embedding data object. Accordingly, in particular embodiments, the audio-based embedding data object may include one or more values representing the relevant spectral features of the voice call. For example, in some embodiments, the audio-based embedding data object is a vector of feature values used to represent the relevant spectral features of the voice call as generated by the audio data processing machine learning model.

In addition to the audio-based embedding data object, the call drop prediction module in various embodiments also generates a transcript-based embedding data object in Operation 520. The transcript-based embedding data object serves in a functional role to represent the semantic features of the voice call over time that can be used in predicting whether the party on the voice call is likely to drop the call before solving the query. In particular embodiments, the call drop prediction module generates the transcript-based embedding data object by invoking a transcript data processing module. In turn, the transcript data processing module processes a transcript generated from the audio of the voice call using an audio transcript processing machine learning model to generate the transcript-based embedding data object. Similar to the audio-based embedding data object, the transcript-based embedding data object may include one or more values representing the relevant semantic features of the voice call. Accordingly, the semantic features can be used to represent the meaning of the words being spoken by the party while on the voice call and interacting with the IVR 230. For example, in some embodiments, the transcript-based embedding data object is a vector of feature values used to represent the relevant semantic features of the voice call as generated by the transcript data processing machine learning model.

Further, in various embodiments, the call drop prediction module generates an event-based embedding data object in Operation 525. The event-based embedding data object can be used to serve in a functional role to represent the features of events occurring for the voice call over time that can be used in predicting whether the party on the voice call is likely to drop the call before solving the query. Accordingly, in particular embodiments, the call drop prediction module is configured to generate the event-based embedding data object by processing an interactive call event sequence descriptor data object using an event sequence processing machine learning model. The interactive call event sequence descriptor data object may represent a sequence of one or more interactive call events that occurs during the voice call while the party interacts with the IVR 230. For example, the interactive call events may involve the party performing some type of action such as selecting a prompt and/or requesting information. In addition, the interactive call events may involve the IVR 230 performing some type of action such running a script, providing a set of prompts, and/or requesting information from the party. Further, the interactive call events may involve a backend system performing some type of action such as running a process to verify the party's identity, running a process to query information needed by the IVR 230 to interact with the party, and/or running a process to submit a credit card payment. In some instances, these interactive call events may be selected from a group of candidate interactive call events that are associated with the IVR 230. Therefore, in some embodiments, the interactive call event sequence descriptor data object may comprise a vector of feature values representing the one or more events in an ordered sequence in which they occurred during the voice call.

In particular embodiments, the event sequence processing machine learning model may include one or more sequential processing layers 121 that are collectively configured to processing the interactive call event sequence descriptor data object and generate the event-based embedding data object. Accordingly, in some embodiments, the one or more sequential processing layers 121 may be configured as a supervised or an unsupervised machine learning model. More specifically, in some embodiments, the one or more sequential processing layers 121 may be configured as one or more deep learning models such as, for example, one or more RNNs, GRUs, LSTMs, and/or the like. For instance, the one or more sequential processing layers 121 may be configured as a supervised machine learning model in which the training of the sequential processing layer(s) 121 is carried out on historical ground truth events and corresponding indicators as to whether a party dropped off the voice call before satisfying his or her query. These indicators can be, for example, determined from whether the party reached a step in the IVR 230 that usually results in a resolved call (e.g., a terminal node), or whether the party dropped the voice call from the IVR 230 before satisfying his or her query. Accordingly, in various embodiments, the audio-based embedding data object, transcript-based embedding data object, and event-based embedding data object may be considered a plurality of inferred interactive call embedding data object that is used in predicting whether the party is likely to drop the voice call before satisfying the query.

Finally, in various embodiments, the call drop prediction module generates an interactive call metadata object in Operation 530. The interactive call metadata object can be used to represent data related to the party such as, for example, identification data on the party, historical event data involving the party, historical data on past voice calls conducted with the party, and/or the like. Accordingly, the call drop prediction module may gather the metadata from some type of data store 275 based at least in part on the party's identity or using some other characteristic of the party and/or voice call. In particular embodiments, the interactive call metadata object may be configured as a vector of feature values that are used to represent various traits and/or characteristics of the party.

As previously noted, in particular embodiments, the real-time call monitoring machine learning framework 100 may include a merge layer 140 configured to combine the different data objects found in the plurality of inferred interactive call embedding data objects. Therefore, in these particular embodiments, the merge layer 140 may include a feature merger machine learning model configured to process the plurality of inferred interactive call embedding data objects and the interactive call metadata object and generate a merged feature data object. For instance, the feature merger machine learning model may be configured to combine the plurality of inferred interactive call embedding data objects and the interactive call metadata into the merged feature data object via concatenation, integration, merger, hashing, and/or the like. Thus, in these embodiments, the call drop prediction module processes the plurality of inferred interactive call embedding data objects and the interactive call metadata object using the feature merger machine learning model to generate the merged feature data object in Operation 535. Accordingly, in some embodiments, the merged feature data object may be configured as a vector of feature values representing different features of the voice call, events associated with the voice call, and/or attributes and characteristics of the party who is on the voice call.

At this point, the call drop prediction module in various embodiments processes the merged feature data object via a dense layer 150 to generate a dense model output data object for the voice call in Operation 540. Accordingly, the dense layer 150 may comprise a dense processing machine learning model that may be configured as a supervised or an unsupervised machine learning model. For instance, in some embodiments, the dense processing machine learning model may be configured as a fully-connected deep learning model such as, for example, a neural network having one or more fully-connected layers. The dense processing machine learning model maps the merged feature data object to a probability estimation on the likelihood of the party dropping the voice call before reaching a conclusion to a query. Depending on the embodiment, the dense model output data object generated by the dense processing machine learning model may provide different representations of the probability estimation. For instance, in some embodiments, the dense model output data object may provide a probability on the party dropping the voice call. In other embodiments, the dense model output data object may provide a classification as to whether the party is likely to drop the voice call.

Finally, in particular embodiments, the call drop prediction module uses the dense output data object in generating the call drop likelihood prediction 160 for the voice call in Operation 545. As previously described, the call drop likelihood prediction 160 can then be used in determining whether one or more prediction-based actions should be carried out to attempt to avoid the party from dropping the voice call if the call drop likelihood prediction 160 indicates a (high) likelihood in the party dropping the voice call.

Audio Data Processing Module

Figure 6:
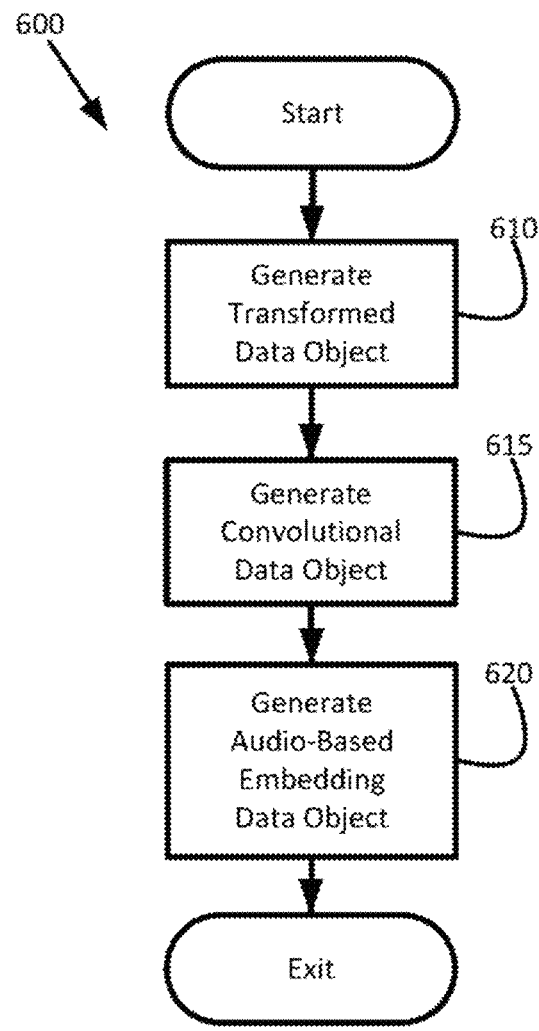
FIG. 6 is a process flow for generating an audio-based embedding data object in accordance with various embodiments of the present disclosure.

Turning now to FIG. 6, additional details are provided regarding a process flow for generating an audio-based embedding data object for a voice call according to various embodiments. FIG. 6 is a flow diagram showing an audio data processing module for performing such functionality according to various embodiments of the disclosure. For example, the flow diagram shown in FIG. 6 may correspond to operations carried out by a processing element 310 in a computing entity 300, such as the CM 250 described in FIG. 2, as it executes the audio data processing module stored in the computing entity's volatile and/or nonvolatile memory.

As detailed previously, an audio-based embedding data object may be generated for a voice call that represents relevant spectral features of the voice call over time that can be used in predicting whether the party on the voice call is likely to drop the call before solving a query. As noted, in some embodiments, the call drop prediction module may invoke the audio data processing module to generate the audio-based embedding data object representing one or more prosodic features of the audio of the voice call. However, with that said, the audio data processing module may be invoked by a different module or may execute as a stand-alone module in other embodiments.

Accordingly, in various embodiments, the audio data processing module is configured to process an interactive call audio data object that represents the audio of the voice call. For example, the interactive call audio data object may be the audio input of the party over an audio channel being used for the voice call or on an audio recording of the voice call. Therefore, in particular embodiments, the audio data processing module processes the interactive call audio data object using an audio data processing machine learning model. Here, the audio data processing machine learning model may include one or more sequential processing layers 113 that are collectively configured to generate the audio-based embedding data object. For instance, in some embodiments, the one or more sequential processing layers 113 may be configured as a supervised or an unsupervised machine learning model. More specifically, in some embodiments, the one or more sequential processing layers 113 may be configured as one or more deep learning models such as, for example, one or more RNNs, GRUs, LSTMs, and/or the like. For instance, the one or more sequential processing layers 113 may be configured as a supervised machine learning model in which the training of the sequential processing layer(s) 113 is carried out on historical ground truth audio data and corresponding indicators as to whether a party dropped off the voice call before satisfying his or her query. These indicators can be, for example, determined from whether the party reached a step in the IVR 230 that usually results in a resolved call (e.g., a terminal node), or whether the party dropped the voice call from the IVR 230 before satisfying his or her query.

In particular embodiments, the audio data processing machine learning model includes an audio transformation layer 111 used to process the interactive call audio data object to generate a transformed audio data object. Therefore, in these embodiments, the process flow 600 begins with the audio data processing module generating the transformed audio data object for the voice call in Operation 610. Accordingly, the transformed audio data object for the voice call may represent one or more prosodic features of the audio for the voice call transformed into the frequency domain. For example, the audio transformation layer 111 may involve generating a Fast Fourier Transform to convert one or more prosodic features, such as volume, pitch, intensity, intonation, stress, rhythm, and/or the like, represented in the interactive call audio data object from the time domain to the frequency domain. In addition, in some embodiments, the audio transformation layer 111 may be configured to generate a spectrogram for the one or more prosodic features to provide a representation of the features in the frequency domain with respect to time.

Continuing, in particular embodiments, the audio data processing machine learning model includes a convolutional layer 112 used to process the transformed audio data object to generate a convolutional data object. Therefore, in these embodiments, the audio data processing module generates the convolutional data object in Operation 615. Accordingly, in particular embodiments, the convolutional layer 112 is configured to perform a one-dimensional (1D) convolution on the transformed audio data object. Here, the convolutional layer 112 creates a convolution kernel that is convolved with the transformed audio data object over a single spatial dimension (e.g., time) to produce the convolutional output data object. Accordingly, in some embodiments, the convolution output data object may represent a vector having feature values extracted for the one or more prosodic features represented by the transformed audio data object.

At that point, the audio data processing module processes the convolutional data object using the one or more sequential processing layers 113 of the audio data processing machine learning model to generate the audio-based embedding data object in Operation 620. As previously noted, in various embodiments, the audio-based embedding data object serves in a functional role within the real-time call monitoring machine learning framework 100 to represent the relevant spectral features of the voice call over time that can be used in predicting whether the party on the voice call is likely to drop the call before solving a query. As also noted, prosodic features can oftentimes reflect various expressions of the party such as emotional state of the party, the form of speech being spoken by the party such as a statement, question, command, and/or the like, the presence of irony or sarcasm, emphasis, contrast, and/or focus.

Transcript Data Processing Module

Figure 7:
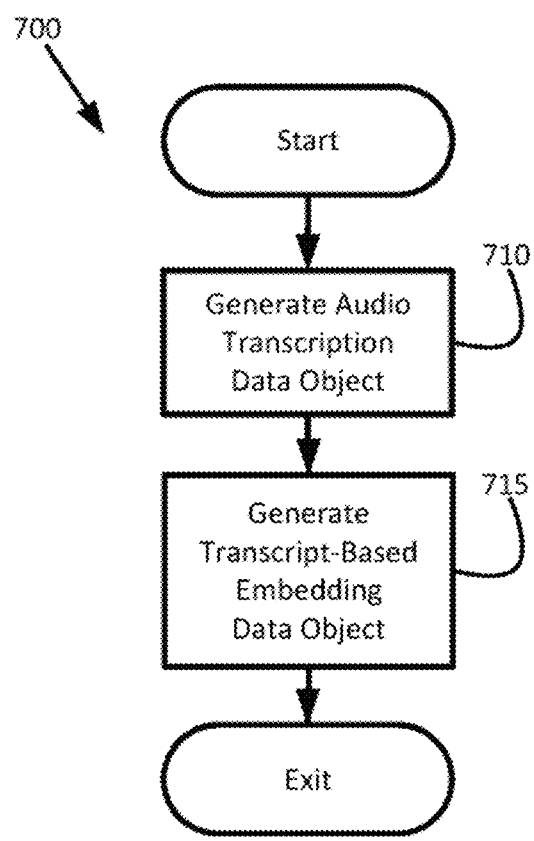
FIG. 7 is a process flow for generating a transcript-based embedding data object in accordance with various embodiments of the present disclosure.

Turning now to FIG. 7, additional details are provided regarding a process flow for generating a transcript-based embedding data object for a voice call according to various embodiments. FIG. 7 is a flow diagram showing a transcript data processing module for performing such functionality according to various embodiments of the disclosure. For example, the flow diagram shown in FIG. 7 may correspond to operations carried out by a processing element 310 in a computing entity 300, such as the CM 250 described in FIG. 2, as it executes the transcript data processing module stored in the computing entity's volatile and/or nonvolatile memory.

As detailed previously, a transcript-based embedding data object may be generated for a voice call that represents relevant semantic features of the voice call over time that can be used in predicting whether the party on the voice call is likely to drop the call before solving a query. As noted, in some embodiments, the call drop prediction module may invoke the transcript data processing module to generate the transcript-based embedding data object representing one or more semantic features of the audio of the voice call. However, with that said, the transcript data processing module may be invoked by a different module or may execute as a stand-alone module in other embodiments.

Thus, in various embodiments, the transcript data processing module is configured to process the interactive call audio data object that represents the audio of the voice call to generate the transcript-based embedding data object for the voice call. Specifically, in particular embodiments, the transcript data processing module may process the interactive call audio data object using a transcript data processing machine learning model. Similar to the audio data processing machine learning module, the transcript data processing machine learning model may include one or more sequential processing layers 115 that are collectively configured to generate the transcript-based embedding data object. For instance, in some embodiments, the one or more sequential processing layers 115 may be configured as a supervised or an unsupervised machine learning model. More specifically, in some embodiments, the one or more sequential processing layers 115 may be configured as one or more deep learning models such as, for example, one or more RNNs, GRUs, LSTMs, and/or the like. For instance, the one or more sequential processing layers 115 may be configured as a supervised machine learning model in which the training of the sequential processing layer(s) 115 is carried out on historical ground truth transcript data and corresponding indicators as to whether a party dropped off the voice call before satisfying his or her query. These indicators can be, for example, determined from whether the party reached a step in the IVR 230 that usually results in a resolved call (e.g., a terminal node), or whether the party dropped the voice call from the IVR 230 before satisfying his or her query.

In particular embodiments, the transcript data processing machine learning model may include a transcription layer 114 for transcribing the audio of the voice call. For instance, in particular embodiments, the transcription layer 114 may be an automatic speech recognition (ASR) component configured to process the interactive call audio data object of the voice call and generate an audio transcript data object of the speech being spoken by the party on the voice call. Here, the audio transcript data object may be a text transcript of the speech being spoken by the party on the voice call. Therefore, in these embodiments, the process flow 700 begins with the transcript data processing module generating the audio transcript data object using the transcription layer 114 in Operation 710. In addition, in some embodiments, the transcription layer 114 may also be configured to perform one or more types of natural language processing on the interactive call audio data object and/or audio transcript data object of the voice call such as normalization, tokenization, embedding, and/or the like. Such processing may help to place the features represented by the audio transcript data object into a better format.

At this point, the transcript data processing module processes the audio transcript data object using the one or more sequential processing layers 115 of the transcript data processing machine learning model to generate the transcript-based embedding data object in Operation 715. As previously noted, in various embodiments, the transcript-based embedding data object serves in a functional role within the real-time call monitoring machine learning framework 100 to represent the semantic features of the voice call over time that can be used in predicting whether the party on the voice call is likely to drop the call before solving a query.

Conclusion

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    identifying, by one or more processors, a plurality of interactive call feature data objects associated with an interactive call data object, wherein the plurality of interactive call feature data objects comprises an interactive call audio data object and an interactive call metadata data object;
    processing, by the one or more processors and using a real-time call monitoring machine learning framework, the plurality of interactive call feature data objects to generate a call drop likelihood prediction, wherein processing the plurality of interactive call feature data objects comprises:
        processing the interactive call audio data object, using an audio data processing machine learning model of the real-time call monitoring machine learning framework, to generate an audio-based embedding data object, wherein the audio-based embedding data object is (a) one of a plurality of inferred interactive call embedding data objects associated with the interactive call data object, (b) representative of spectral features associated with the interactive call data object, and (c) generated by extracting values of one or more prosodic features of the interactive call data object,
        processing the interactive call audio data object, using an audio transcript processing machine learning model of the real-time call monitoring machine learning framework, to generate a transcript-based embedding data object, wherein the transcript-based embedding data object is (a) one of the plurality of inferred interactive call embedding data objects, (b) representative of semantic features associated with the interactive call data object, and (c) generated based on a transcript associated with the interactive call data object, and
        generating the call drop likelihood prediction based on the plurality of inferred interactive call embedding data objects and the interactive call metadata data object; and
    initiating, by the one or more processors, the performance of one or more prediction-based actions based on the call drop likelihood prediction.

2. The computer-implemented method of claim 1, wherein:
    the plurality of interactive call feature data objects further comprises an interactive call event sequence descriptor data object, and
    processing the plurality of interactive call feature data objects further comprises processing the interactive call event sequence descriptor data object using an event sequence processing machine learning model of the real-time call monitoring machine learning framework to generate an event-based embedding data object, wherein the event-based embedding data object is one of the plurality of inferred interactive call embedding data objects.

3. The computer-implemented method of claim 2, wherein the event sequence processing machine learning model comprises one or more sequential processing layers.

4. The computer-implemented method of claim 3, wherein each sequential processing layer of the one or more sequential processing layers is at least one of a recurrent neural network layer or a gated recurrent unit layer.

5. The computer-implemented method of claim 2, wherein:
    the interactive call event sequence descriptor data object describes an ordered sequence of one or more interactive call events,
    each interactive call event of the one or more interactive call events is selected from a plurality of candidate interactive call events, and
    the plurality of candidate interactive call events is associated with an interactive voice response system associated with the interactive call data object.

6. The computer-implemented method of claim 1, wherein the audio data processing machine learning model comprises:
    an audio transformation layer that is configured to process the interactive call audio data object to generate a transformed audio data object; and one or more sequential processing layers that are collectively configured to generate the audio-based embedding data object based on the transformed audio data object.

7. The computer-implemented method of claim 6, wherein:
the audio data processing machine learning model further comprises a convolutional layer that is configured to process the transformed audio data object to generate a convolutional output data object; and
the audio-based embedding data object is generated by processing the convolutional output data object using the one or more sequential processing layers.

8. The computer-implemented method of claim 1, wherein the audio transcript processing machine learning model comprises:
a transcription layer that is configured to process the interactive call audio data object to generate an audio transcript data object, and
one or more sequential processing layers that are collectively configured to generate the transcript-based embedding data object based on the audio transcript data object.

9. The computer-implemented method of claim 1, wherein the interactive call metadata data object comprises one or more caller identifier descriptor data objects that describe one or more caller identifier features associated with a caller identifier profile associated with the interactive call data object.

10. The computer-implemented method of claim 1, wherein generating the call drop likelihood prediction further comprises:
processing the plurality of inferred interactive call embedding data objects and the interactive call metadata data object using a feature merger machine learning model to generate a merged feature data object,
processing the merged feature data object using a dense processing machine learning model to generate a dense model output data object, and
generating the call drop likelihood prediction based on the dense model output data object.

11. An apparatus comprising memory and one or more processors communicatively coupled to the memory, the one or more processors configured to:
identify a plurality of interactive call feature data objects associated with an interactive call data object, wherein the plurality of interactive call feature data objects comprises an interactive call audio data object and an interactive call metadata data object;
process the plurality of interactive call feature data objects using a real-time call monitoring machine learning framework to generate a call drop likelihood prediction, wherein processing the plurality of interactive call feature data objects using the real-time call monitoring machine learning framework comprises:
process the interactive call audio data object, using an audio data processing machine learning model of the real-time call monitoring machine learning framework, to generate an audio-based embedding data object, wherein the audio-based embedding data object is (a) one of a plurality of inferred interactive call embedding data objects associated with the interactive call data object, (b) representative of spectral features associated with the interactive call data object, and (c) generated by extracting values of one or more prosodic features of the interactive call data object,
process the interactive call audio data object, using an audio transcript processing machine learning model of the real-time call monitoring machine learning framework, to generate a transcript-based embedding data object, wherein the transcript-base embedding data object is (a) one of the plurality of inferred interactive call embedding data objects, (b) representative of semantic features associated with the interactive call data object, and (c) generated based on a transcript associated with the interactive call data object, and
generate the call drop likelihood prediction based on the plurality of inferred interactive call embedding data objects and the interactive call metadata data object; and
initiate the performance of one or more prediction-based actions based on the call drop likelihood prediction.

12. The apparatus of claim 11, wherein:
the plurality of interactive call feature data objects further comprises an interactive call event sequence descriptor data object, and
the at least one memory and the program code are configured to, with the at least one processor, cause the apparatus to process the plurality of interactive call feature data objects by processing the interactive call event sequence descriptor data object using an event sequence processing machine learning model of the real-time call monitoring machine learning framework to generate an event-based embedding data object, wherein the event-based embedding data object is one of the plurality of inferred interactive call embedding data objects.

13. The apparatus of claim 11, wherein the audio data processing machine learning model comprises:
an audio transformation layer that is configured to process the interactive call audio data object to generate a transformed audio data object;
a convolutional layer that is configured to process the transformed audio data object to generate a convolutional output data object; and
one or more sequential processing layers that are collectively configured to generate the audio-based embedding data object based on the convolutional output data object.

14. The apparatus of claim 11, wherein the audio transcript processing machine learning model comprises:
a transcription layer that is configured to process the interactive call audio data object to generate an audio transcript data object; and
one or more sequential processing layers that are collectively configured to generate the transcript-based embedding data object based on the audio transcript data object.

15. The apparatus of claim 11, wherein the at least one memory and the program code are configured to, with the at least one processor, further cause the apparatus to generate the call drop likelihood prediction by:
processing the plurality of inferred interactive call embedding data objects and the interactive call metadata data object using a feature merger machine learning model to generate a merged feature data object,
processing the merged feature data object using a dense processing machine learning model to generate a dense model output data object, and
generating the call drop likelihood prediction based on the dense model output data object.

16. One or more non-transitory computer storage media including instructions that, when executed by one or more processors, cause the one or more processors to:
- identify a plurality of interactive call feature data objects associated with an interactive call data object, wherein the plurality of interactive call feature data objects comprises an interactive call audio data object and an interactive call metadata data object;
- process the plurality of interactive call feature data objects using a real-time call monitoring machine learning framework to generate a call drop likelihood prediction, wherein processing the plurality of interactive call feature data objects using the real-time call monitoring machine learning framework comprises:
  - process the interactive call audio data object, using an audio data processing machine learning model of the real-time call monitoring machine learning framework, to generate an audio-based embedding data object, wherein the audio-based embedding data object is (a) one of a plurality of inferred interactive call embedding data objects associated with the interactive call data object, (b) representative of spectral features associated with the interactive call data object, and (c) generated by extracting values of one or more prosodic features of the interactive call data object,
  - process the interactive call audio data object, using an audio transcript processing machine learning model of the real-time call monitoring machine learning framework, to generate a transcript-based embedding data object, wherein the transcript-based embedding data object is (a) one of the plurality of inferred interactive call embedding data objects, (b) representative of semantic features associated with the interactive call data object, and (c) generated based on a transcript associated with the interactive call data object, and
  - generate the call drop likelihood prediction based on the plurality of inferred interactive call embedding data objects and the interactive call metadata data object; and
- initiate the performance of one or more prediction-based actions based on the call drop likelihood prediction.

17. The one or more non-transitory computer-readable storage media of claim 16, wherein:
- the plurality of interactive call feature data objects further comprises an interactive call event sequence descriptor data object, and
- the instructions further cause the one or more computer processors to at least perform operations configured to process the plurality of interactive call feature data objects by processing the interactive call event sequence descriptor data object using an event sequence processing machine learning model of the real-time call monitoring machine learning framework to generate an event-based embedding data object, wherein the event-based embedding data object is one of the plurality of inferred interactive call embedding data objects.

18. The one or more non-transitory computer-readable storage media of claim 16, wherein the audio data processing machine learning model comprises:
- an audio transformation layer that is configured to process the interactive call audio data object to generate a transformed audio data object;
- a convolutional layer that is configured to process the transformed audio data object to generate a convolutional output data object; and
- one or more sequential processing layers that are collectively configured to generate the audio-based embedding data object based on the convolutional output data object.

19. The one or more non-transitory computer-readable storage media of claim 16, wherein the audio transcript processing machine learning model comprises:
- a transcription layer that is configured to process the interactive call audio data object to generate an audio transcript data object; and
- one or more sequential processing layers that are collectively configured to generate the transcript-based embedding data object based on the audio transcript data object.

20. The one or more non-transitory computer-readable storage media of claim 16, wherein the instructions are configured to further cause the one or more computer processors to at least perform operations configured to generate the call drop likelihood by:
- processing the plurality of inferred interactive call embedding data objects and the interactive call metadata data object using a feature merger machine learning model to generate a merged feature data object,
- processing the merged feature data object using a dense processing machine learning model to generate a dense model output data object, and
- generating the call drop likelihood prediction based on the dense model output data object.

* * * * *

UNITED STATES PATENT AND TRADEMARK OFFICE
CERTIFICATE OF CORRECTION

PATENT NO. : 11,647,115 B2
APPLICATION NO. : 17/157064
DATED : May 9, 2023
INVENTOR(S) : Mariah Sonja Pereira Penha et al.

Page 1 of 1

It is certified that error appears in the above-identified patent and that said Letters Patent is hereby corrected as shown below:

In the Claims

In Column 33, Line 1, Claim 16, delete "computer storage media" and insert -- computer-readable storage media --, therefor.

In Column 34, Lines 35-36, Claim 20, delete "instructions are configured to further" and insert -- instructions further --, therefor.

Signed and Sealed this
Eighteenth Day of July, 2023

Katherine Kelly Vidal
*Director of the United States Patent and Trademark Office*